United States Patent [19]

Katono et al.

[11] Patent Number: 4,918,549
[45] Date of Patent: Apr. 17, 1990

[54] AUTOMATIC CASSETTE LOADING APPARATUS

[75] Inventors: Noboru Katono, Mito; Yoshihiro Shibata, Katsuta; Tadashi Takamiya, Nakaminato, all of Japan

[73] Assignee: Hitachi, Ltd., Tokyo, Japan

[21] Appl. No.: 289,532

[22] Filed: Dec. 27, 1988

Related U.S. Application Data

[63] Continuation of Ser. No. 57,661, Jun. 10, 1987, abandoned, which is a continuation of Ser. No. 619,379, Jun. 11, 1984, abandoned.

[30] Foreign Application Priority Data

Jun. 15, 1983 [JP] Japan .................................. 58-105788

[51] Int. Cl.⁴ ............................................ G11B 15/00
[52] U.S. Cl. ...................................... 360/93; 360/96.5
[58] Field of Search ...................... 360/93, 96.1, 96.5, 360/96.6, 69, 71; 242/197, 198, 199, 200

[56] References Cited

U.S. PATENT DOCUMENTS

| | | | |
|---|---|---|---|
| 4,295,169 | 10/1981 | Iwata et al. | 360/93 |
| 4,308,562 | 12/1981 | Negishi | 360/93 |
| 4,319,292 | 3/1982 | Katoh | 360/96.5 |
| 4,320,424 | 3/1982 | Murayama | 360/71 |
| 4,424,540 | 1/1984 | Naoi | 360/93 |
| 4,484,240 | 11/1984 | Yoshida | 360/96.5 |
| 4,499,573 | 2/1985 | Morinaga | 360/133 |

FOREIGN PATENT DOCUMENTS 0026360 2/1983 Japan ................................ 360/96.5

Primary Examiner—Robert S. Tupper
Assistant Examiner—Andrew L. Sniezek
Attorney, Agent, or Firm—Antonelli, Terry & Wands

[57] ABSTRACT

An automatic cassette loading apparatus in which a tape cassette containing a magnetic tape is held and transported forwardly and returned between a cassette insertion position and a cassette loaded position. The number of switches is reduced by use of a rotary cam and a drive arm, and a drive motor and the switches are combined on the same printed circuit board.

11 Claims, 13 Drawing Sheets

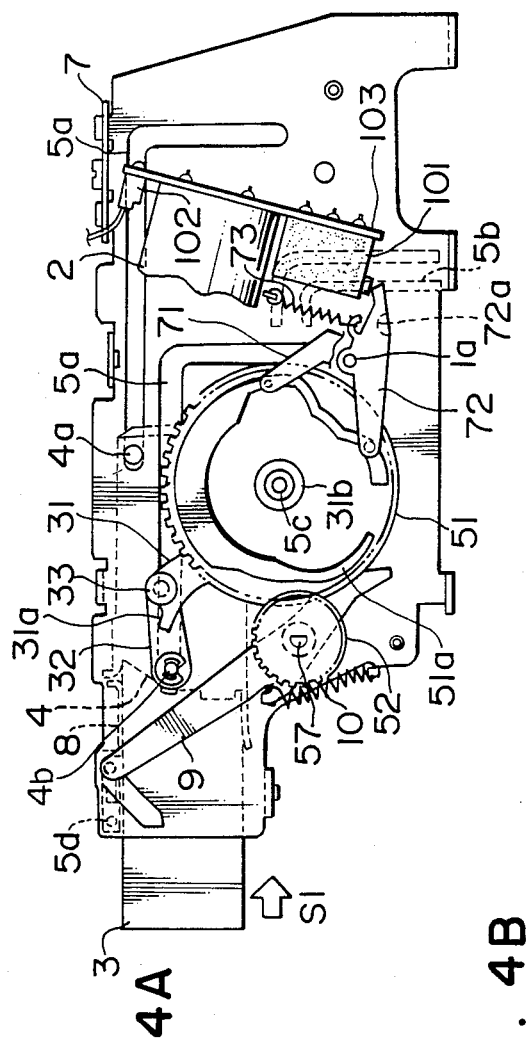
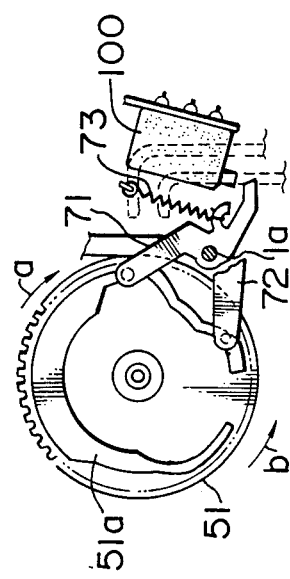
FIG. 4A
FIG. 4B

FIG. 9
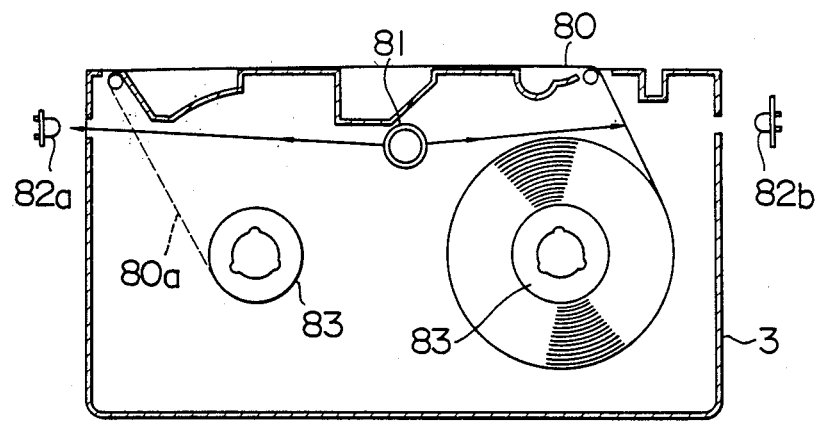
FIG.10A
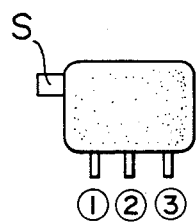
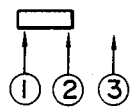
FIG.10B
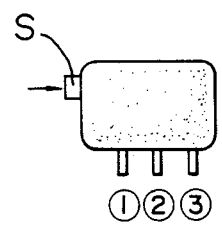
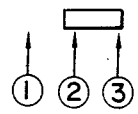

AUTOMATIC CASSETTE LOADING APPARATUS

This application is a continuation of application Ser. No. 057,661, filed on June 10, 1987, which is a continuation of application Ser. No. 619,379, filed June 11, 1984, both now abandoned.

BACKGROUND OF THE INVENTION

The present invention relates to an automatic cassette front loading apparatus for a magnetic video tape recording/reproducing system.

In a conventional cassette-type front loading video tape recorder, a cassette holder, accommodating a tape cassette, is transported first horizontally and then vertically, so that the cassette is moved from a delivery position to a loaded position.

The cassette is transported, through a gear train by a loading motor to the cassette holder. In the process, it is necessary that operating commands are properly given to the loading motor.

In conventional video tape recorders, the commands are supplied to the loading motor substantially in the manner described below.

Upon a detection of the cassette insertion by a cassette insertion detection switch, the command for forward rotation is applied to a loading motor. The cassette is transported, and when it reaches the loaded position, the cassette loading detection switch detects the loaded condition and issues a stop command to the loading motor.

To remove the cassette, the cassette holder is returned from the loaded position to the delivery position. In the process, the loading motor is reversely rotated in response to an eject command, and when the cassette holder reaches delivery position, a cassette delivery position detection switch detects the delivery position with a cassette delivery position detection switch, and issues a stop command to the loading motor.

In the conventional video tape recorders at least three switches are necessary for cassette insertion detection, detection of the loaded position and detection of cassette delivery in controlling the rotation of the loading motor, with the switches being arranged at positions convenient for machine design. As a result, these switches are mounted at some distance from each other with electric lead wires laid extensively from the switches, thus increasing the production cost.

The object of the present invention is to provide an automatic cassette loading apparatus using only two switches juxtaposed at a point to detect various positions of a cassette holder, thereby simplifying a electrical wiring and construction.

According to the present invention, an automatic cassette loading apparatus is provided which comprises a loading motor, a pair of switches arranged at a point for the loading motor, a print wiring board on which the switches and the loading motor are mounted to reduce the wiring requirements, a gear with a cam slot for driving the cassette holder, a first arm member driven by being displaced by the cam slot to operate the switches, and a second arm member for transporting the cassette holder, the first arm member being also operated by the second arm member to control the loading motor in response to command through the two switches, thus reducing the wiring and simplifying the construction.

The above and other objects, features and advantages of the present invention will be more clear from the following description with reference to the accompanying drawings, in which:

BRIEF DESCRIPTION OF THE DRAWINGS

FIGS. 4A and 4B are right side views of the cassette loading apparatus at the delivery position;

FIG. 9 is a plan view of a cassette;

FIGS. 10A and 10B are diagrams for explaining the conditions of switches;

DETAILED DESCRIPTION

Figure 1:
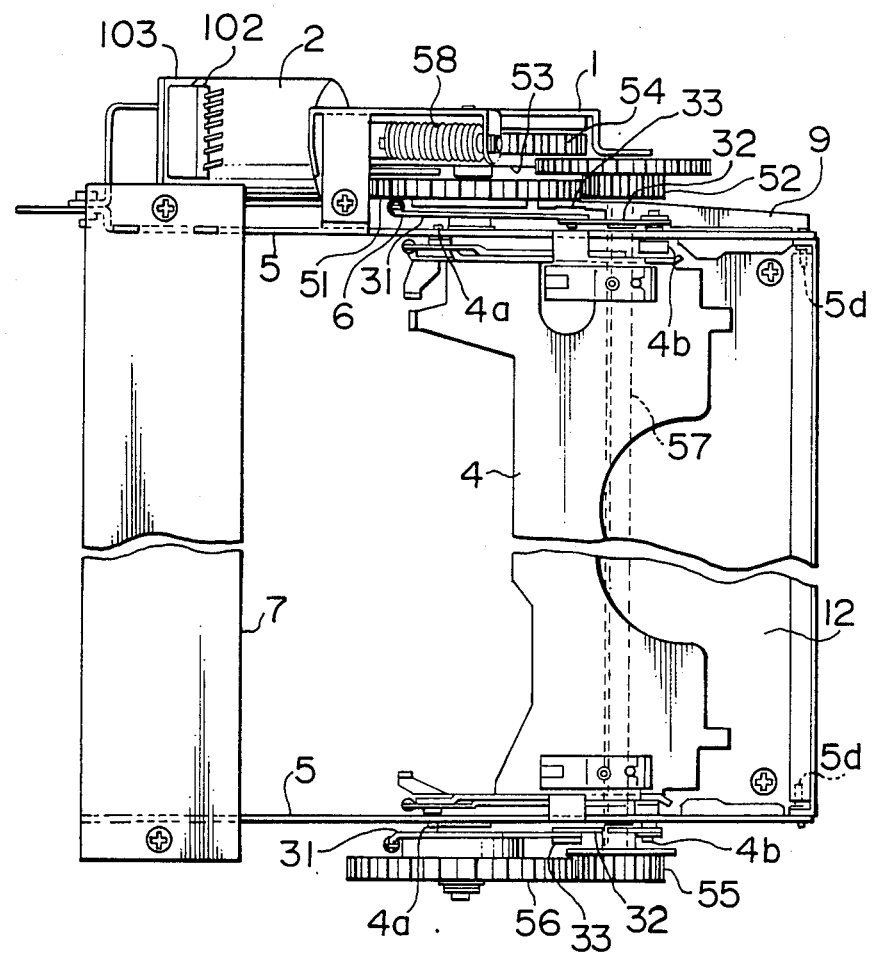
FIG. 1 is a plan view of a cassette loading apparatus in accordance with an embodiment of the present invention.

An embodiment of the present invention will be explained below with reference to a cassette loading apparatus for home VTR as shown in the drawings.

Referring now to the drawings wherein like reference numerals are used throughout the various views to designate like parts and, more particularly, to FIG. 1, according to this figure, a cassette loading apparatus has side brackets 5, arranged on the sides thereof, fixedly connected into a gate form by a guide plate 12 on this side, that is, the front end and by a coupling plate 7 on the other side.

The right bracket 5 (upper side in FIG. 1) carries a motor bracket 1 mounted thereon, which in turn carries an arm shaft 1a and a wheel shaft 1b. The side brackets 5, as shown in FIG. 4A, has a guide slot 5a and a guide 5b for holding and guiding the cassette holder. The side brackets 5 further include a driving gear shaft 5c and a door shaft 5d. A guide plate 12 is integrally formed with a bearing 12a of a synchronous shaft 57 (See FIG. 3).

Figure 5:
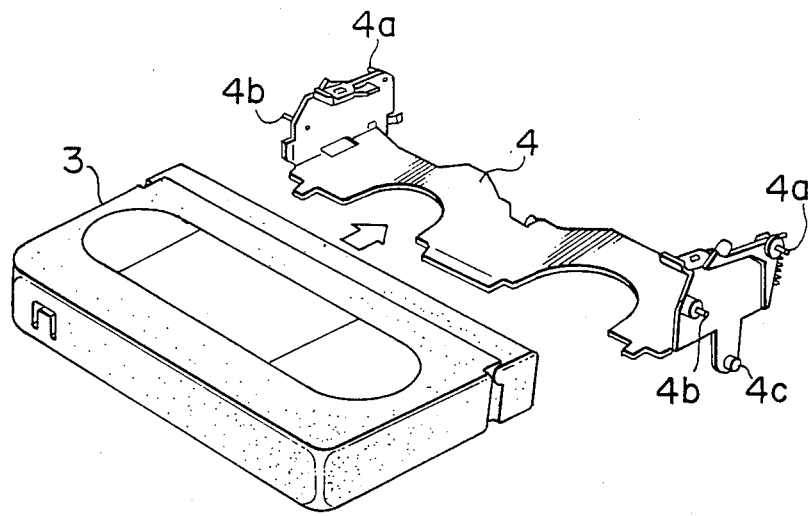
FIG. 5 is a perspective view of a cassette holder.

The cassette holder 4 is located between the side brackets 5. As shown in the perspective view of FIG. 5, guide pins 4a, 4b, 4c are secured to the cassette holder 4, with the guide pins 4a, 4b being slidably engaged through the guide slot 5a (FIG. 4A) of the side bracket 5, and the guide pin 4c in the guide 5b. The guide pin 4c guides the cassette holder 4 into engagement with the guide 5b in starting vertical movement at the end of horizontal movement.

As shown in FIG. 4A, the guide pin 4b secured to the cassette holder 4, has a link 32 rotatably mounted at an end thereof, with the other end thereof being rotatably coupled with the forward end of a drive arm 31 by a mounting pin 33. The forward end of the drive arm 31 is further formed with an arm protrusion 31a, and a cylindrical bushing 31b is secured to the root of the drive arm 31.

The bushing 31b of the drive arm 31 is rotatably supported by the drive gear shaft 5c of the side brackets 5, so that the cassette holder 4 is movable horizontally and vertically by the drive arm 31 and the link 32 around the drive gear shaft 5c.

Figure 6:
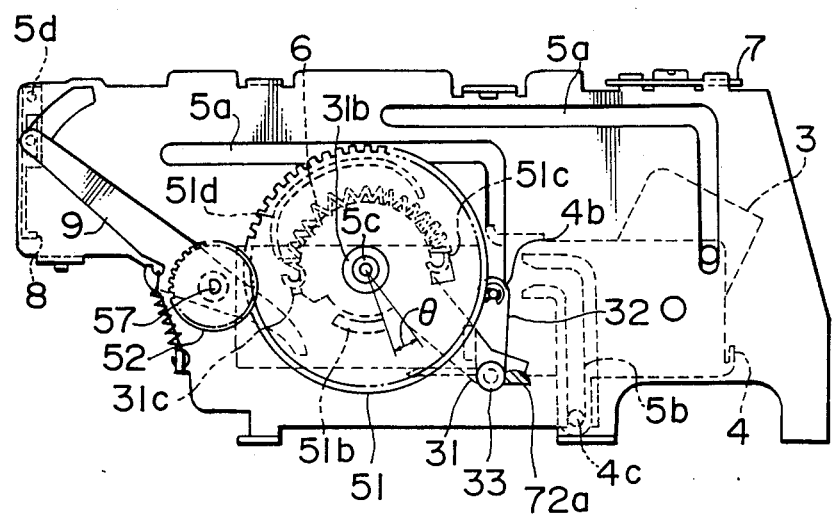
FIG. 6 is a side view for depicting conditions of a driving gear and a driving arm at the loaded cassette position.

The outer surface of the right drive gear 51, as shown in FIGS. 4A and 4B, is formed with a cam slot 51, while the inner surface thereof has an arm engaging portion 51b, a spring hook 51c and a door arm operating rib 51d erected thereon (See FIG. 6).

The drive gear 56 on the left (lower portion of FIG. 1) is the same as the drive gear 51 except that the cam slot 51a and the door arm operating rib 51d are not provided.

The hole of the rotational center of the drive gear 51 is rotatably supported by the bushing 31b of the drive arm 31. As shown in FIG. 6, a tension coil spring 6 is suspended between the spring hook 31c of the drive arm 31 and the spring hook 51c of the drive gear 51. The drive arm 31 and the drive gear 51 are adapted to rotate relatively to each other within a predetermined rotational angle against the torque generated by the tension coil spring 6.

Figure 3:
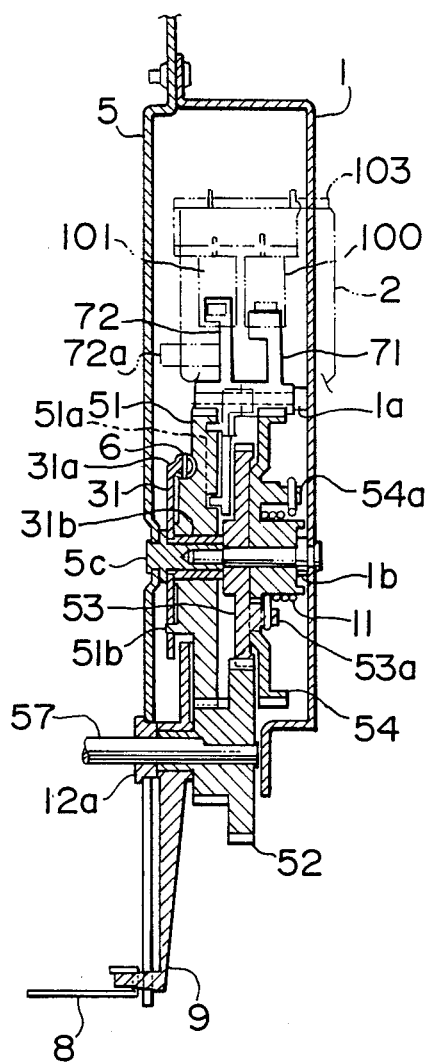
FIG. 3 is a right side sectional view of a cassette loading apparatus of FIG. 1.

In FIGS. 1 and 3, the synchronous gears 52 and 55 on right and left sides are integrally coupled with each other by a synchronous shaft 57 rotatably supported by a bearing 12a provided on a guide plate 12. This gear set is engaged with the drive gear 56 on the left side thereof, and with the drive gear 51 and the spring hook gear 53 on the right side thereof.

It is seen from FIG. 3 that the spring hook gear 53 is rotatably supported on a wheel shaft 1b of a motor bracket 1 together with the worm wheel 54. The worm wheel 54 has a spring hook 54a formed thereon, while the spring hook gear 53 has a spring hook 53a erected thereon. Between these two gears, a torsion coil spring 11 is suspended. The sprig hool gear 53 and the worm wheel 54 (though not shown in detail) are adapted to be relatively rotatable against the torque generated by the torsion coil spring 11 within a predetermined rotation angles.

The worm gear 58, mounted on the output shaft of the loading motor 2 fixed on the motor bracket 1, transmits the power by engagement with the worm wheel 54 shown in FIGS. 1 and 3. Specifically, upon forward rotation of the loading motor 2, power is transmitted to the worm gear 58, the worm wheel 54, the spring hook gear 53, the synchronous gear 52, the synchronous shaft 57, the synchronous gear 55, the drive gear 51, the drive gear 56, the drive arm 31, the link 32, and the cassette holder 4, thereby transporting the cassette holder 4 in the forward direction of arrow a (FIG. 4B).

In the case where the loading motor 2 rotates in reverse direction, the cassette holder 4 is transported in return direction of arrow b in FIG. 4B along the route mentioned above.

The terminals of the loading motor 2 are embedded in the print circuit board 103 as shown in FIGS. 1 and 4A, the print circuit board 103 is held by the loading motor 2. Further, a first switch 100 and a second switch 101. (See FIGS. 3 and 4A, 4B) are embedded in juxtaposition in the print circuit board 103. Also, a connector 102 is embedded at a point above the loading motor (FIGS. 1 and 4A), both of which are electrically connected by the printed wiring process on the print circuit board (not shown).

As shown in FIG. 3, the arm shaft 1a of the motor bracket 1 rotatably supports the first switch arm 71 and the second switch arm 72, so that they are provided with the turning effort in the counterclockwise direction by the arm spring 73 shown in FIGS. 4A and 4B. An end of each of the first switch arm 71 and the second switch arm 72 is arranged at a position within pressing reach of the operating knobs of the first and second switches 100 and 101, repsectively, the other end thereof being fitted in the cam slot 51a of the drive gear 51 respectively. As a result, the first and second switch arms 71 and 72 are rotated by the rotational angle of the drive gear 51, resulting in the operating knobs of the switches being depresses for separation.

The second switch arm 72 has an extending arm member 72a arranged as to be rotated by contact with the arm protrusion 31a of the drive arm 31 as shown in FIG. 6.

The cassette loading operation begins with the cassette delivery position where the cassette holder 4 is located as shown in FIG. 4A. First, the cassette 3 is pressed in a direction of the direction of arrow S1 so as to upwardly push the door 8 supported on the door shaft 5d whereby, the cassette 3 is loaded in the cassette holder 4 at the cassette delivery position.

Figure 7A:
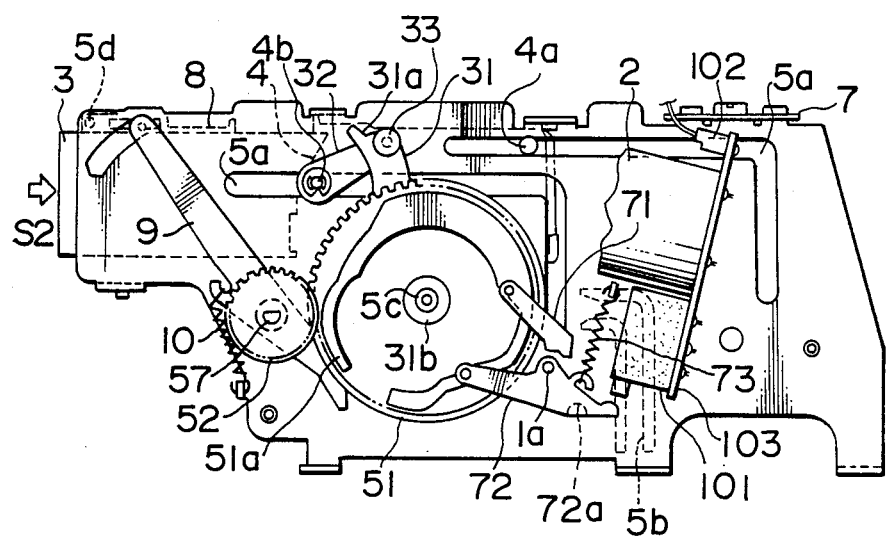
FIGS. 7A and 7B are right side views of a cassette loading apparatus at the cassette insertion detected position.

As shown in FIG. 7A, the cassette 3 is further displaced in a direction of the arrow S2 to the cassette insertion position, with such displacement being manually performed by pushing the cassette holder 4 to the cassette insertion position. In the process, the worm gear 58 mounted on the loading motor 2 does not start and the pushing or displaced stroke is absorbed by the torsion coil spring 11 shown in FIG. 3. Consequently, the movement of the cassette holder 4 is absorbed by the rotation of the drive gear 51, the synchronous gear 52 and the spring hook gear 53. Normally, the energizing torque of the torsion spring 11 causes the worm wheel 54 and the spring hook gear 53 to integrally rotate to transmit power.

Figure 8A:
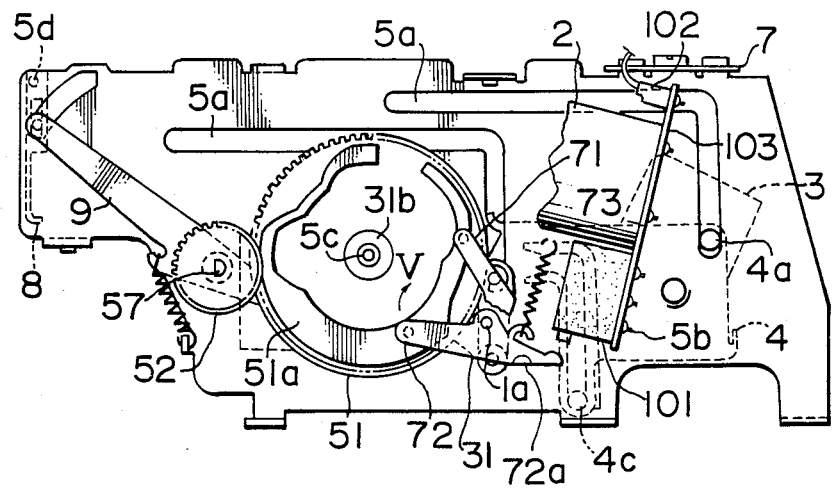
FIGS. 8A and 8B are right side views of a cassette loading apparatus at the rightly-loaded cassette position.

When the cassette 3 is pushed in the direction of the arrow S2, the loading motor 2 rotates in forward direction, so that the cassette 3 moves automatically, first horizontally to the loaded cassette position shown in FIG. 8A and then vertically with the cassette holder 4 in a process of forward transport. When the cassette holder reaches the loaded position, the loading motor 2 stops. It is well known that pictures and sounds are recorded and reproduced on a magnetic tape 80 at this loaded cassette position.

In removing the cassette, an eject button, provided on the VTR (not shown), is depressed, to reversely rotates the loading motor 2 and, in this manner, the cassette 3 moves in the direction opposite to the forward transport direction with the cassette holder 4. In other words, the cassette 3 is moved first vertically and then horizontally to the cassette delivery position shown in FIG. 4A in a process of the return or removal transport. When the cassette 3 reaches the cassette delivery position, the loading motor 2 stops.

During this return process, the door 8 is operated with the door arm 9 being rotated by the door arm operating rib 51d of the drive gear 51 shown in FIG. 6 in such a manner so as not to adversely affect the passage of the cassette 3 in return movement.

FIG. 10 shows the conditions of the first switch 100 and the second switch 101 for giving a rotation command to the loading motor 2. Each of the first and second switches 100 and 101 is what is called the one-circuit 2-contact slide switch. In the manner shown in FIG. 10A, when the operating knob S is released, the terminals ① and ② are shorted while the terminals ② and ③ are disconnected. In this condition, the first switch 100 is defined as in "low" state and the second switch 101 is "high" state. When the terminals ① and ② are disconnected and the terminals ② and ③ shorted to each other with the operating knob S pushed in, by contrast, the first and second switches 100 and 101 are assumed to be in "high" and "low" states, respectively.

The above-noted switch conditions are summarized in Table 1 below.

TABLE 1

|  | Operating knob S released (terminals ① and ② shorted, and terminals ② and ③ disconnected | Operation knob pushed (terminals ① and ② disconnected, terminals ② and ③ shorted) |
| --- | --- | --- |
| First switch 100 | "Low" state | "High" state |
| Second switch 101 | "High" state | "Low" state |

At the cassette delivery position shown in FIGS. 4A and 4B, the operating knob of the second switch 101 shown in FIG. 4A is pushed by the second switch arm 72 energized by the arm spring 73. As a result, as shown in FIGS. 10A and 10B, the second switch 101 is in "low" state.

The operating knob of the first switch 100 shown in FIG. 4B, which is restricted so as not to press the operating knob by the cam slot 51a against the energization force of the arm spring 73, is maintained unpressed. The first switch 100 is thus also in "low" state as shown in FIGS. 10A and 10B. In the cassette delivery position shown in FIGS. 4A and 4B, both the first switch 100 and the second switch 101 are in the "low" state.

Figure 7B:
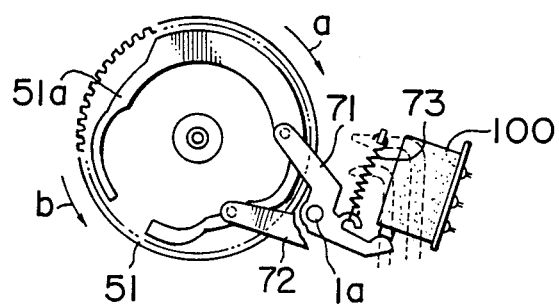

When the cassette 3 is pressed into the cassette insertion position shown in FIGS. 7A and 7B, the operating knob of the first switch 100 is pressed into "high" state as shown in FIG. 7B, while the operating knob of the second switch is in "high" state by being released as shown in FIG. 7A.

Figure 8B:
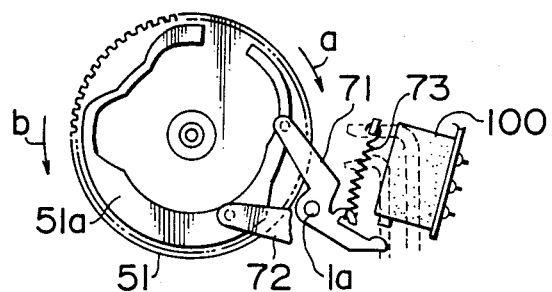

In the loaded cassette position shown in FIG. 8, it is seen that the first switch 100 is in "low" state as shown in FIG. 8B and the second switch 101 is "high" state as shown in FIG. 8A. The second switch arm 72, which operates the second switch 101, is rotated not by the cam slot 51a but by contact with the arm member 72a of the second switch arm 72 through the arm protrusion 31a of the drive arm 31.

In FIG. 6, the cassette 3 is pressed downward by rotating the drive arm 31 clockwise through the tension coil spring 6. Normally, the tension coil spring 6 causes the drive arm 31 to come into contact with the arm engaging portion 51b formed on the drive gear 51, and to thereby integrally operate with the drive gear 51. When the cassette 3 reaches the loaded position, however, the cassette 3 stops moving upward by being brought into contact with a predetermined height-positioning pin (not shown). As a result, only the drive arm 31 is prevented from rotating in clockwise direction.

In other words, the cassette holder 4 is also stopped so that the drive arm 31 is not rotated. However, drive gear 51, further rotates, and as a result of rotation of the drive arm 51 by a predetermined angle θ as shown in FIG. 6, the arm engaging portion 51b is released. Upon release of the arm engaging portion 51b, the cassette holder 4 is brought into pressed contact by the tension coil spring 6.

In the process, the drive arm 31 presses the arm member 72a of the second switch arm 72 to thereby release the operating knob the second switch 101. In other words, drive arm 31 operates the second switch arm 72, followed by the operation of the first switch arm 100 by the cam slot 51a of the drive gear 51, so that the position of the cassette holder 4 can be accurately detected to produce a predetermined pressing force.

Figure 11:
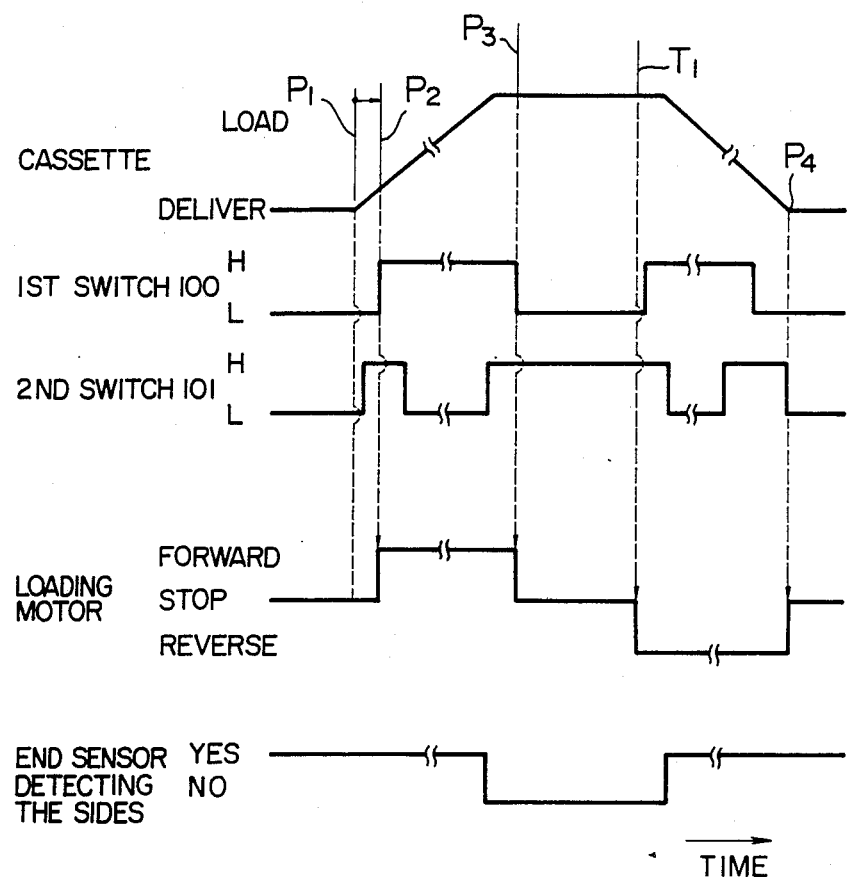
FIG. 11 is a time chart for explaining the operation of a cassette loading apparatus.

The conditions of operation mentioned above are shown in the time chart of FIG. 11. At the cassette delivery position $P_1$, both the first switch and the second switch are in "low" state. First in the forward transport process, the cassette 3 is pushed into the cassette holder 4 from the cassette delivery position $P_1$ toward the cassette insertion position $P_2$. Immediately after the cassette 3 is pushed in, the second switch 101 changes to "high" state. At the cassette insertion position $P_2$, the first switch 100 is waited for to change to "high" state. Specifically, when the first switch 100 changes to "high" state, a command is applied to the microprocessor for forward rotation of the loading motor 2 thereby rotate the loading motor 2 in forward direction.

During the forward transport, the second switch 101 is again placed in the "low" state by the cam slot 51a. When the cassette 3 approaches the loaded position $P_3$, the drive arm 31 places the second switch 101 into the "high" state, and then the first switch 100 awaits for a change to a "low" state as mentioned above. At the next loaded cassette position $P_3$, the first switch 100 changes to "low" state, which notifies the microprocessor to provide a command for stopping the motor rotation, thus stopping the loading motor 2.

In the return transport, an eject command produced at the press of an eject button at time point $T_1$ is applied to the microprocessor, to thereby to rotate the loading motor 2 in the reverse direction. During the return process obtained by reverse rotation of the loading motor 2, the first switch 100 changes from "low" to "high" state, followed by the second switch 101 changing from "high" to "low" state. After the return process is continued for some time further, the second switch 101 again turns from the "low" to the "high" state.

When the cassette approaches the cassette delivery position $P_4$, the first switch 100 changes from the "high" to "low" state, and awaits the second switch 101 to change to the "low" state. When the cassette delivery position $P_4$ is reached, the second switch 101 changes to "low" state, and this condition is supplied to the microprocessor, which issues a command to stop the rotation of the loading motor 2.

As mentioned above, according to the present invention, the operation of the loading motor 2 is only controlled by a pair of switches. In order to discriminate a situation of unloaded transport, that is, to detect the cassette holder 4 transported to the loaded position without any cassette, however, the system described below is additionally provided.

It is well known that a magnetic video tape recording/reproducing apparatus is provided with a device for detecting an end of magnetic tape. Specifically, as shown in FIG. 9, a light-emitting element 81 is arranged in proximity to the center of the cassette 3 at the rightly-loaded position, and light-receiving elements 82a, 82b are disposed on the outsides of the cassette 3. The light-receiving elements 82a, 82b receive the light from the light-emitting element 81, which light is amplified by an amplifier (not shown) and converted into an electrical signal applied to the microprocessor shown in FIG. 12 to detect an end of the magnetic tape 80 encased in the cassette 3.

More specifically, the magnetic tape 80, opaque to light, is provided with a transparent leader tape portion 80a (dashed portion in FIG. 9) at the leading and trailing ends thereof wound on the tape reel 83, so that the light is detected at the tape ends by the light-receiving element 82a or 82b and transferred to the microprocessor to detect a tape end.

In this embodiment, the above-mentioned system is used in such a manner that when the light-receiving elements 82a, 82b detect light at the same time, the cassette 3 is considered unloaded, and, if the cassette holder 4 is in the loaded position under this condition, the loading motor 2 is rotated in a reverse direction. Also when power is restored after a power failure or like during transportation, the above-mentioned systems may be combined to provide means for identifying the conditions of the cassette holder 4.

Figure 12:
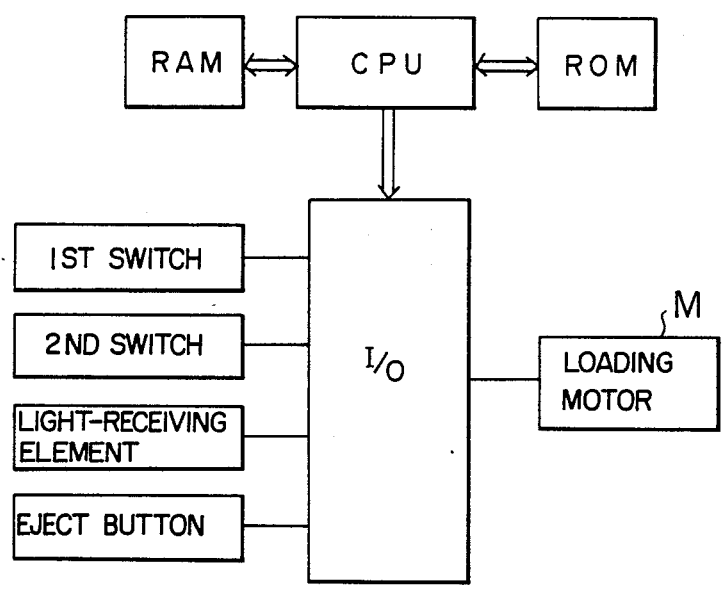
FIG. 12 is a block diagram showing a circuit of an electronic control unit for controlling the cassette loading apparatus.

As shown in FIG. 12, the microprocessor includes a central processing unit CPU, memories RAM and ROM and an input/output circuit I/O. The input terminal of input/output circuit I/O is connected with the first and second switches, light-receiving elements and the eject button. The output of the input/output circuit, is connected with the loading motor M.

Figure 13:
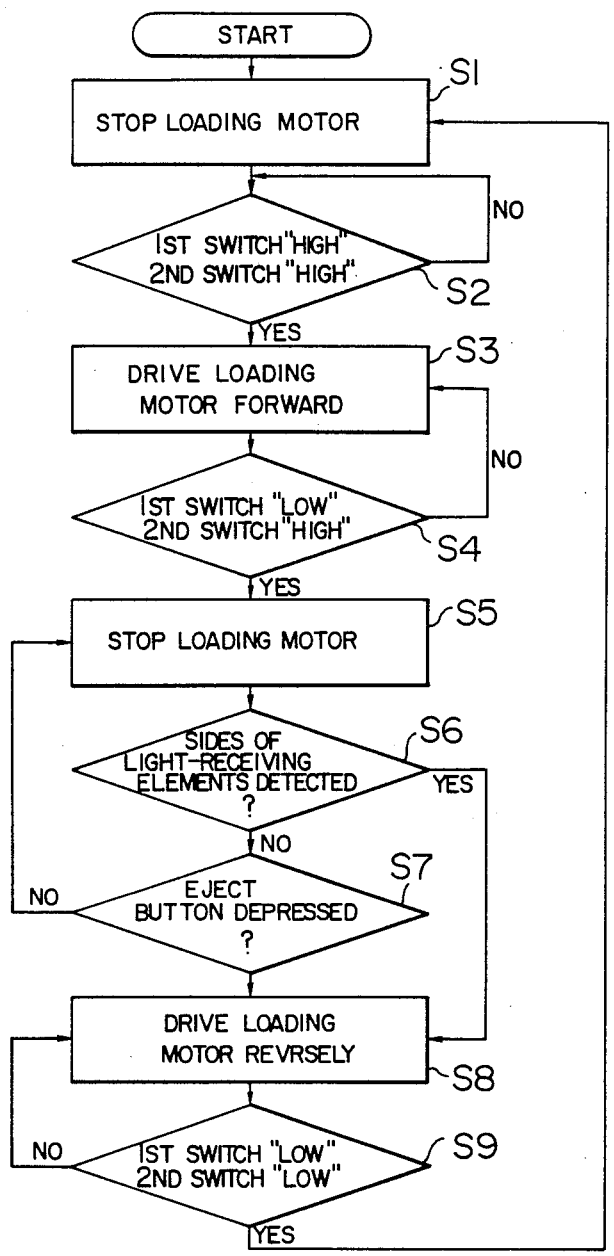
FIG. 13 is a flowchart for explaining the functions of a microprocessor.

As shown in FIG. 13, in step S1, the loading motor is stopped and awaits an insertion of the cassette. Step S2 monitors the input signals from the first switch 100 and the second switch 101 to determine if the switches 100, 101 have changed to a "high" state, and, if changed to a "high" state, the process proceeds to Step S3, wherein the cassette insertion is thus detected and the loading motor is driven in a forward direction. Step S4 monitors the condition of the apparatus to determine whether or not the input signals from the first switch 100 has changed to a "low" state and the input signal from the second switch 101 to a "high" level, and if they have so changed, the process proceeds to Step S5. Consequently, Step S4 detects the fact that the cassette has arrived at the loaded position. In Step S5, the loading motor is stopped thereby completing the cassette loading process.

As also shown in FIG. 13, Step S6 determines whether or not the light-receiving elements placed on both sides of the cassette have detected the light transmitted from the light emitting element placed near a center of the cassette. If the light is not detected, the process proceeds to Step S7, whereas, if the light is detected, the process proceeds to Step S8. Thus, Step S6 decides whether or not the cassette has been loaded.

In Step S7, it is decided whether or not the eject button has been depressed and, if not depressed, the process is returned to Step S5, and, if the answer is "yes" the process proceeds to Step S8, wherein the loading motor is driven in the reverse direction. At this point, it is to be noted that during Steps S5 to S7, the magnetic recording or reproducing operation is performed.

In Step S9, a detection of whether or not the input signals from the first and second switches 100, 101 are at the "low" level is performed and, until the first and second switch 100, 101 are both at the "low" level, the loading motor continues to be driven. When the first and second switches 100, 101 change to the "low" level, it indicates that the cassette has reached the delivery position, so that the process is returned to step S1 to stop the loading motor. In this manner, the microprocessor is controlled to perform a series of operations including the insertion, mounting, and delivery of the cassette.

FIGS. 14 to 17 provide additional illustrations of the elements described in the previous figures. As such like reference numerals correspond to those used in the previous figures, and the operation of these elements also corresponds to that previously described.

Figure 2:
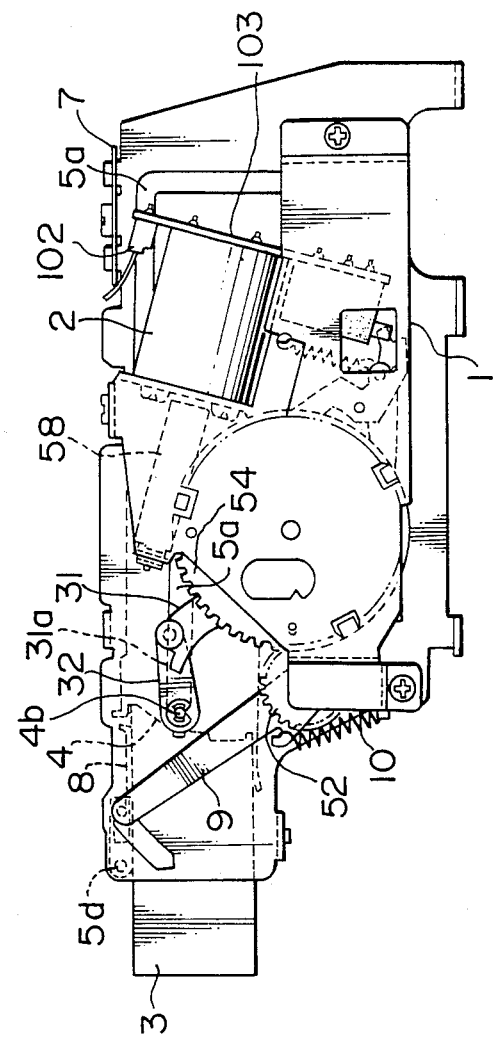
FIG. 2 is a right side view of the cassette loading apparatus of FIG. 1.
Figure 14:
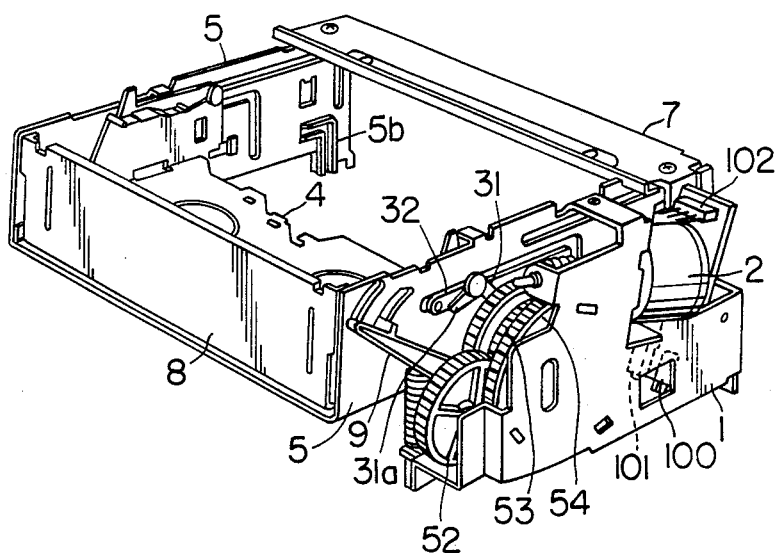
FIG. 14 is a perspective view of the FIG. 1 embodiment of the invention.
Figure 15:
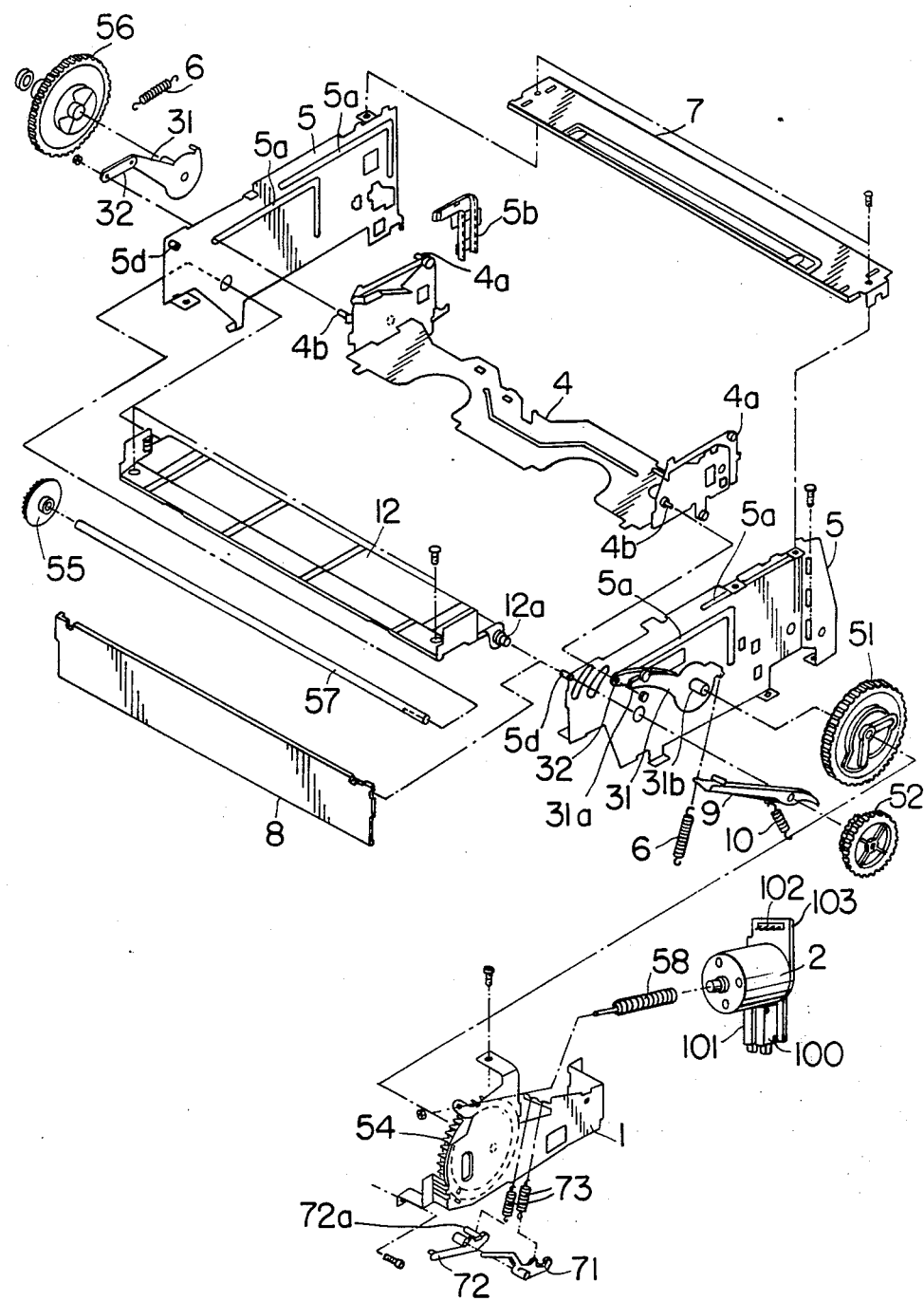
FIG. 15 is an exploded view of the arrangement shown in FIGS. 1 and 14.

FIG. 14 provides a perspective view of the embodiment shown in FIGS. 1 to 3. FIG. 15 provides an exploded view of the arrangement of FIG. 14. In both of these figures, the location of the two switches 100 and 101 is particularly illustrated to correlate the illustrations of the embodiment shown in FIGS. 1 to 3.

Figure 16:
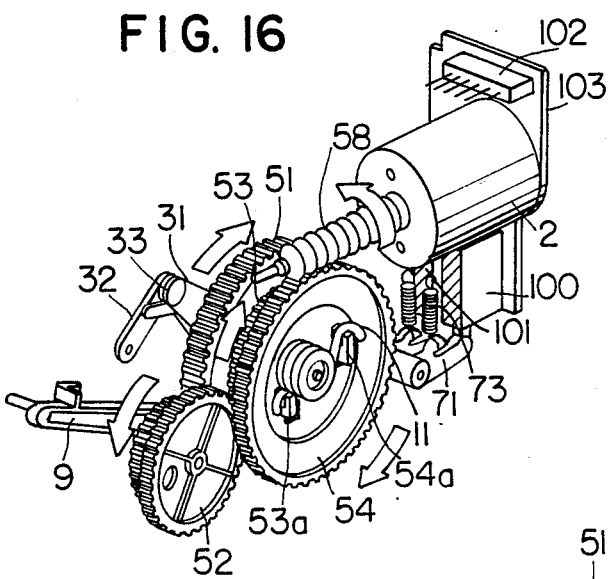
FIG. 16 shows the operation of various gears coupled to the motor during a tape cassette loading operation.

FIG. 16 provides an illustration of the operation of the various elements such as the worm wheel 54, the synchronous gear 52, the drive gear 51 and the worm gear 58 during a forward loading operation of the cassette tape.

Figure 17:
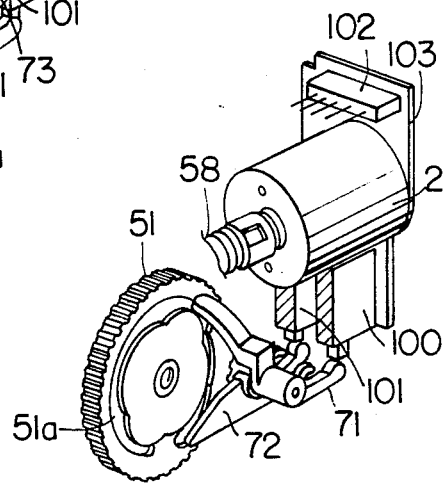
FIG. 17 is a cut-away view in which the worm wheel 54 is removed to provide a better illustration of the switches and switch arms.

FIG. 17 is a perspective cut-away view wherein the worm wheel 54 has been removed in order to permit a better illustration of the position of the switches 100 and 101 and the switch arms 71 and 72.

According to the present invention, the conditions are identified by the position of the cassette holder for holding and transporting the cassette, and the detector means for issuing commands to the loading motor are provided with only two switches. These two switches are combined and, together with the terminals of the loading motor, are embedded in a print circuit board. In this manner, one switch is eliminated and the need of the wiring between switches and for the motor are eliminated, thereby greatly reducing the production cost.

We claim:

1. An automatic cassette loading apparatus in which a cassette holder for holding and transporting a tape cassette is moved between respective positions of a cassette delivery position, a cassette insertion position, and a cassette loaded position comprising:

a loading motor;
power transmission means coupled to said motor for transmitting drive power from said loading motor to said cassette holder to cause transporting of said cassette holder between predetermined ones of said respective positions; a cam means included in said power transmission means which is moved in response to the transmission of power by said power transmission means;
first and second members which each have a first end, coupled to said cam means, and a second end;

first and second switches which each have a high and a low state, the high and low states of the first switch being controlled by the second end of the first member and the high and low states of the second switch being controlled by the second end of the second member;

an end of tape sensor including a photodetector arrangement for detecting both leading and trailing end of tape conditions of the tape cassette when the tape cassette is in a tape loaded position and reaches a leading or trailing end of its tape, wherein the photodetector arrangement of the end of tape sensor is in a first predetermined state when the tape cassette is not in the cassette loaded position, wherein the photodetector arrangement is in a second predetermined state when the tape cassette is in the cassette loaded position and is not in either a leading or trailing end of tape condition, wherein the photodetector arrangement is in a third predetermined state when the tape cassette is in the cassette loaded position and in a leading end of tape condition, and wherein the photodetector arrangement is in a fourth predetermined state when the tape cassette is in the cassette loaded position and in a trailing end of tape condition; and control means, responsive to the states of said first and second switches and the first, second, third and fourth predetermined states of the photodetector arrangement of the end of tape sensor for controlling the activation of said motor to move said cassette holder between predetermined ones of the cassette delivery position, the cassette insertion position and the cassette loaded position, in such a manner that the cassette delivery position is defined by a second mode of said first switch, a second mode of said second switch and the first predetermined state of said photodetector arrangement of the end of tape sensor, the cassette insertion position is defined by a first mode of said first switch, a first mode of said second switch and said first predetermined state of said photodetector arrangement of the end of tape sensor, and the cassette loaded position is defined by said second mode of said first switch, said first mode of said second switch and the second, third or fourth predetermined state of said photodetector arrangement of the end of tape sensor.

2. An automatic cassette loading apparatus in accordance with claim 1 wherein said cam means includes a rotary cam.

3. An automatic cassette loading apparatus in accordance with claim 2 wherein said power transmission means includes a gear train.

4. An automatic cassette loading apparatus according to claim 1, wherein said first and second switches are mounted adjacent to one another on a printed circuit board adjacent to said loading motor.

5. An automatic cassette loading apparatus according to claim 4, wherein said printed circuit board is mounted on said loading motor.

6. An automatic cassette loading apparatus according to claim 1, wherein said photodetector arrangement includes a light-emitting diode arrangement to direct light toward the tape of said tape cassette when said tape cassette is in the cassette loaded position, and a pair of photodetectors on opposite sides of said tape cassette for sensing leading and trailing edges of said tape of said tape cassette, wherein one of said photodetectors will receive light from the light-emitting diode when the tape is at its leading end while the other photodetector does not receive light, wherein the other of said photodetectors will receive light from the light-emitting diode when the tape is at its trailing end while said one photodetector does not receive light, and further wherein the first state of said photodetector arrangement comprises both photodetectors receiving light from the light-emitting diode when said tape cassette is not in the cassette loaded position, and wherein the second state of said photodetector arrangement comprises both of said pair of photodetectors not receiving light from said light-emitting diode by virtue of the tape in the tape cassette blocking the light to said photodetectors when the tape cassette is in the cassette loaded position.

7. An automatic cassette loading apparatus according to claim 1, wherein said control means comprises a logic control means.

8. An automatic cassette loading apparatus according to claim 7, wherein said logic control means comprises a CPU.

9. An automatic cassette loading apparatus according to claim 1, wherein said first mode of said first switch and said second switch is said high state and said second mode of said first switch and said second switch is said low state.

10. An automatic cassette loading apparatus according to claim 6, wherein said first mode of said first switch and said second switch is said high state and said second mode of said first switch and said second switch is said low state.

11. An automatic cassette loading apparatus in which a cassette holder for holding and transporting a tape cassette is moved between respective positions of a cassette delivery position, a cassette insertion position, and a cassette loaded position comprising:

a loading motor;

power transmission means coupled to said motor for transmitting drive power from said loading motor to said cassette holder to cause transporting of said cassette holder between predetermined ones of said respective positions;

a cam means included in said power transmission means which is moved in response to the transmission of power by said power transmission means;

first and second members which each have a first end, coupled to said cam means, and a second end;

first and second switches which each have a high and a low state, the high and low states of the first switch being controlled by the second end of the first member and the high and low states of the second switch being controlled by the second end of the second member;

an end of tape sensor including a photodetector arrangement for detecting both leading and trailing end of tape conditions of the tape cassette when the tape cassette is in a tape loaded position and reaches a leading or trailing end of its tape, wherein the photodetector arrangement of the end of tape sensor is in a first predetermined state when the tape cassette is not in the cassette loaded position, wherein the photodetector arrangement is in a second predetermined state when the tape cassette is in the cassette loaded position and is not in either a leading or trailing end of tape condition, wherein the photodetector arrangement is in a third predetermined state when the tape cassette is in the cassette loaded position and in a leading end of tape condition, and wherein the photodetector arrangement is in a fourth predetermined state when the tape cassette is in the cassette loaded position and in a trailing end of tape condition; and control means, responsive to the states of said first and second switches and the first, second, third and fourth predetermined states of the photodetector arrangement of the end of tape sensor for controlling the activation of said motor to move said cassette holder between predetermined ones of the cassette delivery position, the cassette insertion position and the cassette loaded position, said control means including means for loading the tape cassette by:

(a) detecting that the tape cassette has been pushed into the cassette insertion position by detecting that the first switch is in a first mode, the second switch is in a first mode and the photodetector arrangement of the end of tape sensor is in the first predetermined state;

(b) driving the load motor in a forward direction in response to detecting that the tape cassette has been pushed into the tape insertion position;

(c) detecting that the tape cassette has reached the tape loaded position by detecting that the first switch is in a second mode, the second switch is in the first mode and the photodetector arrangement of the end of tape sensor is in the second, third or fourth predetermined state; and (d) stopping the loading motor in response to the detection that the tape cassette has reached the tape loaded position, said control means further including means for unloading the tape cassette by:

(e) detecting that an eject button has been pressed;

(f) driving the loading motor in a reverse direction in response to detecting that the eject button has been pressed;

(g) detecting that the tape cassette has reached the tape delivery position by detecting that the first switch is in the second mode, the second switch is in a second mode and the photodetector arrangement of the end of tape sensor is in the first predetermined state; and (h) stopping the load motor when the tape delivery position is detected.

* * * * *